United States Patent [19]
Yoo et al.

[11] Patent Number: 5,872,835
[45] Date of Patent: Feb. 16, 1999

[54] DATA INTERFACE CIRCUIT FOR PORTABLE TERMINAL EQUIPMENT

[75] Inventors: Yong-Ho Yoo; Nam-Sik Joo; Won-Jo Lee, all of Seoul, Rep. of Korea

[73] Assignee: LG Electronics Inc., Seoul, Rep. of Korea

[21] Appl. No.: 518,888

[22] Filed: Aug. 24, 1995

[30] Foreign Application Priority Data

Aug. 24, 1994 [KR] Rep. of Korea ............... 20947/1994

[51] Int. Cl.⁶ ............................................. H04M 11/00
[52] U.S. Cl. .............................. 379/93.07; 379/93.28; 455/557
[58] Field of Search ................... 379/98, 93, 94, 379/97, 58, 59, 442, 443, 444, 90, 110, 100, 93.05, 93.07, 93.08, 93.09, 93.28; 375/222; 455/426, 556, 557

[56] References Cited

U.S. PATENT DOCUMENTS

| | | | |
|---|---|---|---|
| 4,991,197 | 2/1991 | Morris | 379/98 |
| 5,353,334 | 10/1994 | O'Sullivan | 379/98 |
| 5,428,671 | 6/1995 | Dykes et al. | 379/93 |
| 5,524,047 | 6/1996 | Brown et al. | 379/98 |
| 5,602,902 | 2/1997 | Satterlund et al. | 379/98 |

Primary Examiner—Stella Woo

[57] ABSTRACT

A data interface circuit for portable radio terminal equipment having wire and radio data communication functions, thereby capable of being applied to a variety of communication systems. For a communication using a radio network, the signal type is changed from a differential-ended-signal (DES) type highly influenced by noise to a single-ended-signal (SES) type hardly influenced by noise by an operation of the radio interface unit, thereby enabling the redundancy to noise to be increased. Furthermore, it is possible to provide various audio services by the audio signal processing control unit.

9 Claims, 3 Drawing Sheets

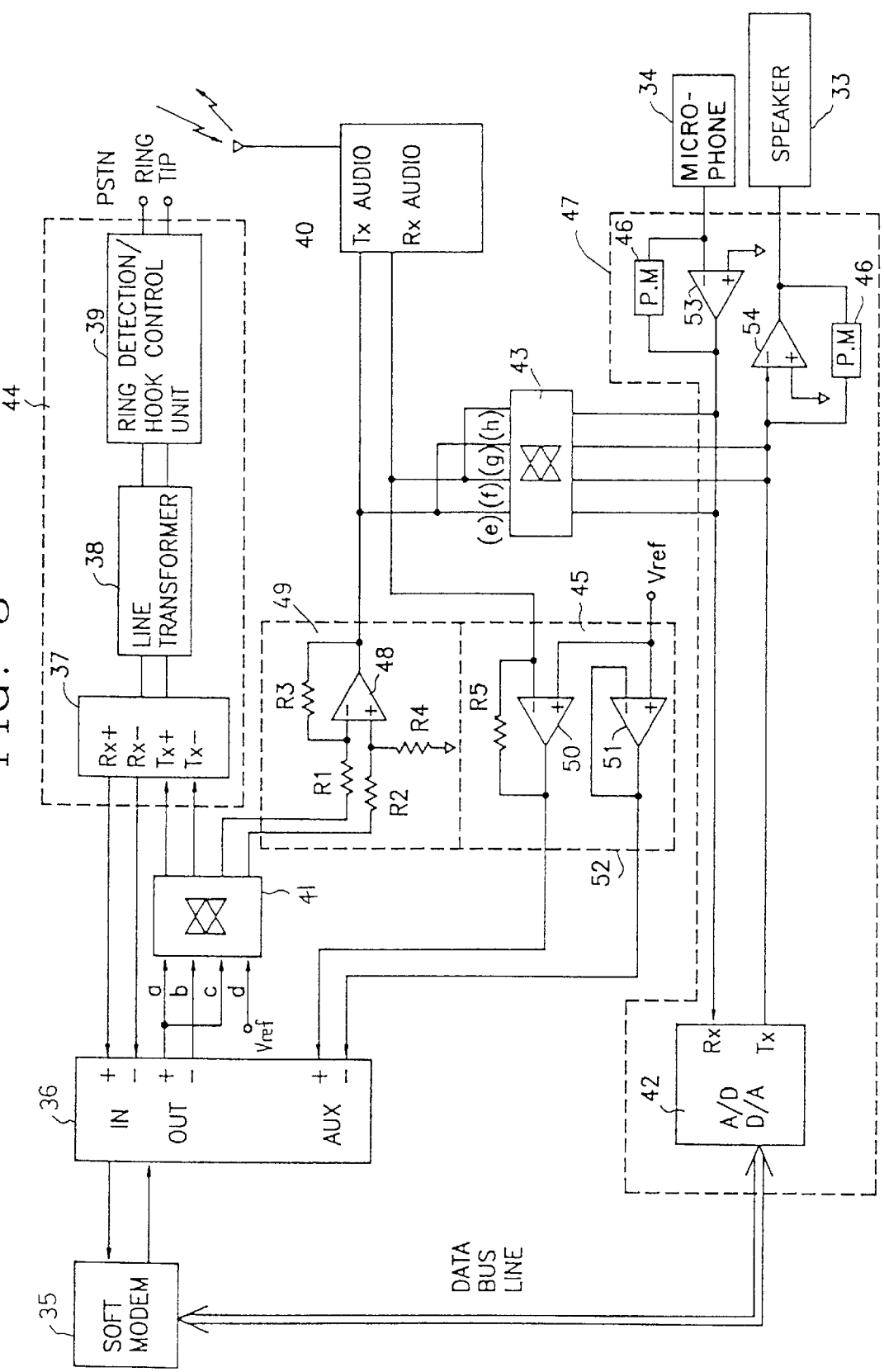

DATA INTERFACE CIRCUIT FOR PORTABLE TERMINAL EQUIPMENT

BACKGROUND OF THE INVENTION

1. Field of the Invention

The present invention relates to portable data terminal equipment having a communication function, and more particularly to a data interface circuit capable of connecting portable data terminal equipment to a public switched telephone network (PSTN) and an analog cellular network, thereby enabling data transmission and reception.

2. Description of the Prior Art

Modems are digital communication equipment (DCE) for transmitting and receiving data between data terminal equipment by use of channels in the audio band. Such data terminal equipment is usually a personal computer.

FIGS. 1A and 1B are views for explaining the conventional concept of data communications in a data terminal equipment wherein data transmission and reception are achieved using PSTN's. Data terminal equipment such as personal or portable computers carry out data transmission and reception with other personal or portable computers via a modem serving as DCE and PSTN. Used as an interface technique between the data terminal equipment and the DCE is V.24, which is a standard scheme of Comite Consoltatif International pour Telegraphie et Telephonie (CCITT) typically called "RS232C". A data access arrangement (DAA) is used as an interface between the DCE and the PSTN, as in general telephones. As shown in FIG. 1B, the modem, which is the DCE, includes a modem control circuit 1 and an analog interface circuit 2. The DAA includes a hybrid circuit 3 and a line transformer 4 and serves to protect terminal equipment connected to the PSTN from a surge voltage. In this case, the hybrid circuit 3 is an impedance matching circuit for separating a transmitting signal Tx and a receiving signal Rx on a transmission line from each other. The line transformer 4 serves to optimize a signal TIP transmitted from the data terminal equipment to the PSTN and a signal RING received from the PSTN to the data terminal equipment for an impedance matching.

Recently, utilization of data transmission and reception using radio networks, such as cellular networks, has been abruptly increasing. In this case, transmitting-side and receiving-side cellular phones carry out data transmission and reception with each other by a trunking operation of a base station, as shown in FIG. 2A. Since radio channels are used in this case, as different from the PSTN shown in FIG. 1, modems, which are DCE's, should be constructed to transmit and receive radio frequency signals. Each modem should also be interfaced with the associated cellular phone executing a cellular protocol. Generally, the interface between the DCE and the cellular phone includes a hybrid circuit 3 and a line transformer 4. Additionally, this interface also includes an Rx/Tx separating circuit 5. This Rx/Tx separating circuit 5 serves to separate the transmitting signal Tx and the receiving signal Rx on the transmission line from each other, similar to the hybrid circuit 3 used in the DAA. It is advantageous that the Rx/Tx separating circuit 5 is provided with an operational amplifier because input and output signals of cellular phones are generally single-ended signals. As shown in FIG. 2B, signals on nodes A are used in this case, taking into consideration an impedance matching of the hybrid circuit 3.

In the above-mentioned conventional interface circuit, however, a signal attenuation occurs because the additional Rx/Tx separating circuit should be used to connect the modem and the cellular phone.. As a result, there is a limitation on data transfer rate. It is also difficult to provide various services because the interface circuit does not take into consideration the establishment of audio application path at all.

SUMMARY OF THE INVENTION

Therefore, an object of the invention is to provide a data interface circuit for portable data terminal equipment capable of making the portable data terminal equipment perform a communication function for wire or radio audio and data.

In accordance with the present invention, this object is accomplished by providing a data interface circuit for connecting data terminal equipment to a public switched telephone network and an analog cellular network, comprising: a soft modem adapted to control the overall system; an analog interface unit connected to the soft modem and adapted to convert data received thereto or transmitted therefrom into a processible signal; a wire interface unit provided with a pair of transmitting and receiving signal lines respectively connected to the analog interface unit and the public switched telephone network; a radio interface unit provided with a pair of transmitting and receiving signal lines respectively connected to the analog interface unit and the analog cellular network via a cellular phone modulator; an audio signal processing control unit connected to the soft modem and adapted to perform compression and expansion of audio signals being transmitted therefrom or received thereto as well as audio service functions; a first switching unit adapted to switch a transmitting signal from the analog interface unit between the wire interface unit and the radio interface unit; and a second switching unit connected between the audio signal processing control unit and the analog cellular network and adapted to switch signals transmitted from or received to the audio signal processing control unit.

BRIEF DESCRIPTION OF THE DRAWINGS

Other objects and aspects of the invention will become apparent from the following description of embodiments with reference to the accompanying drawings in which:

FIG. 3 is a block diagram illustrating a data interface circuit for portable data terminal equipment in accordance with the present invention.

DESCRIPTION OF THE PREFERRED EMBODIMENTS

Figure 1A:
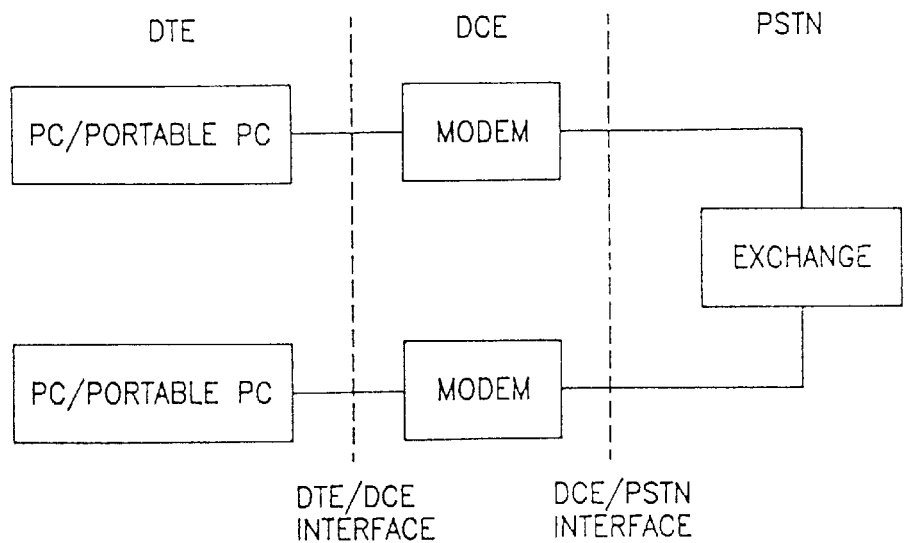
FIGS. 1A and 1B are block diagrams respectively explaining the conventional concept of data communications using a PSTN.
Figure 1B:
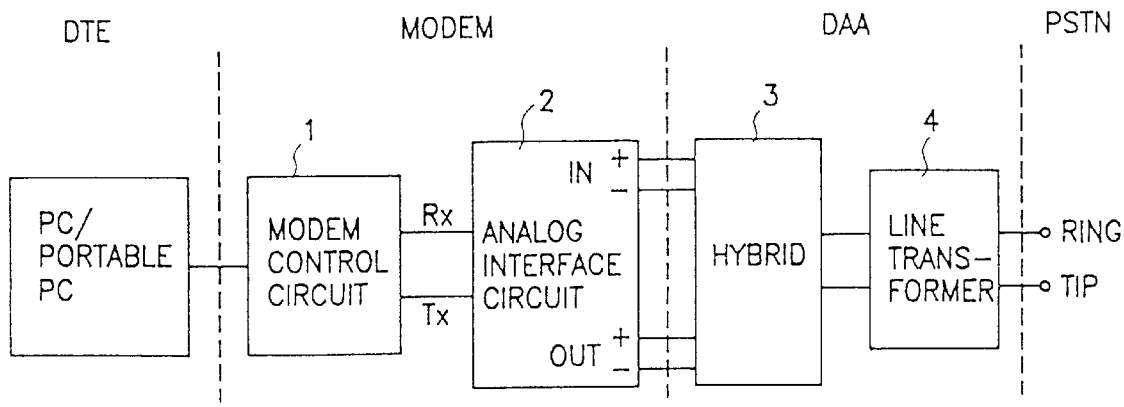
Figure 2A:
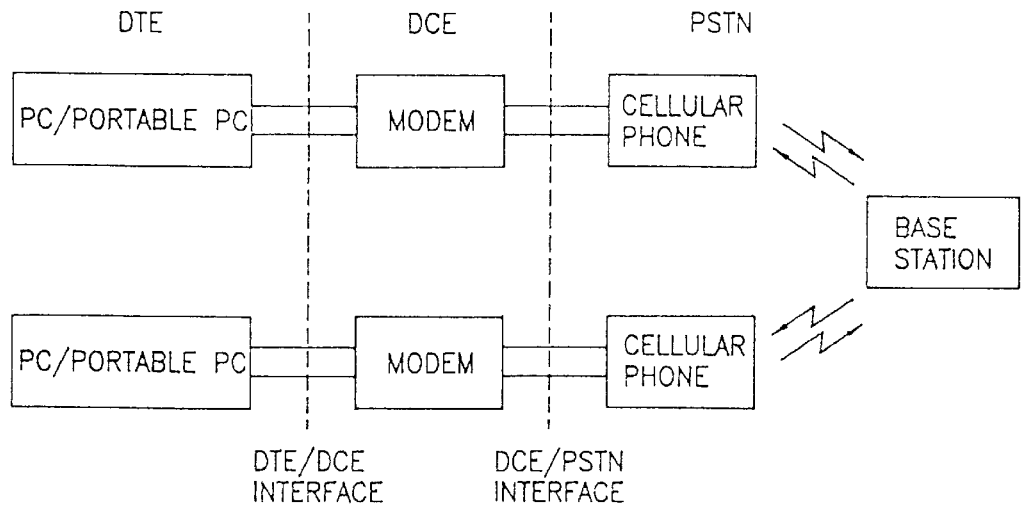
FIGS. 2A and 2B are block diagrams respectively explaining the conventional concept of data communications using an analog cellular network.
Figure 2B:
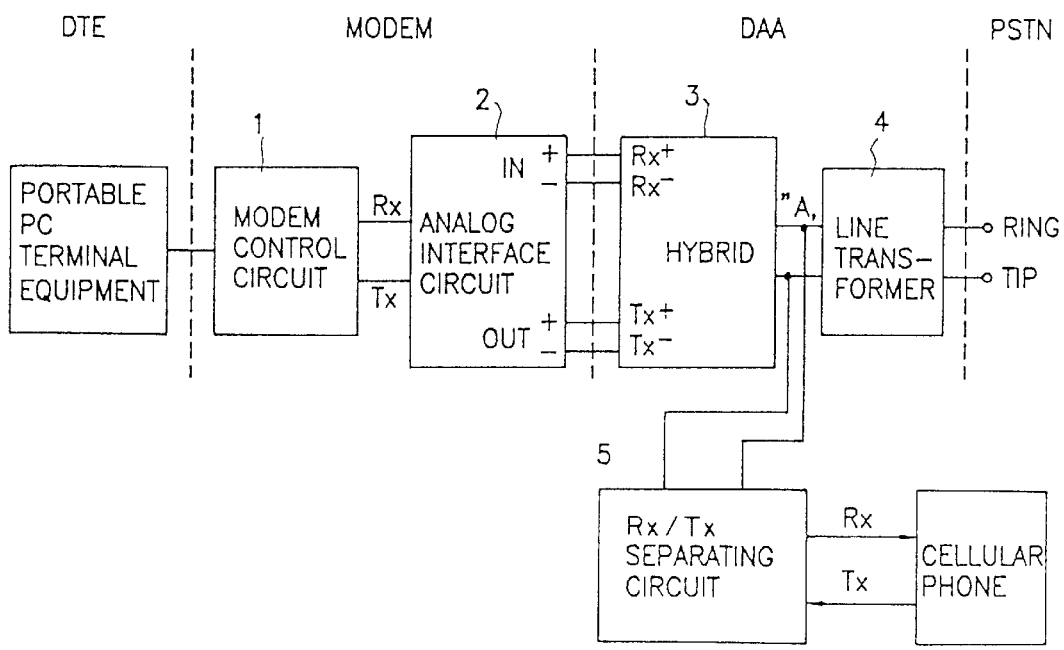

Where portable data terminal equipment is desired to have a communication function, it should be constructed to transmit and receive data as well as audio signals by utilizing both wire and radio channels. FIG. 3 illustrates a circuit capable of providing such a function. The circuit shown in FIG. 3 includes a soft modem 35 capable of programming a modem algorithm and constituted by a digital signal processor (DSP) and analog/digital (A/D) and digital/analog (D/A) converters to control the overall system. An analog interface unit 36 is connected to the soft modem 35. The analog interface unit 36 is adapted to convert data received thereto or transmitted therefrom into a processible signal (namely, analog or digital signal). The interface circuit further includes an wire interface unit 44 provided with a pair of transmitting and receiving signal lines respectively connected to the analog interface unit 36 and a PSTN, a radio interface unit 45 provided with a pair of transmitting and receiving signal lines respectively connected to the analog interface unit 36 and an analog cellular network via a cellular modulator 40 of a cellular phone. To the soft modem 35, a audio signal processing control unit 47 is connected which serves to perform compression and expansion of audio signals being transmitted therefrom and received thereto as well as monitoring the signals. The interface circuit also includes a first switching unit 41 for switching a transmitting signal from the analog interface unit 36 and a second switching unit 43 for switching signals transmitted from or received to the audio signal processing control unit 47.

The wire interface unit 44 includes a hybrid circuit 37 provided with a receiving signal line directly connected to the analog interface unit 36 and a transmitting signal line indirectly connected to the analog interface unit 36 via the first switching unit 41. The hybrid circuit 37 serves to separate a transmitting signal Tx and a receiving signal Rx from each other. A line transformer 38 is connected to the hybrid circuit 37 via transmitting and receiving signal lines. The line transformer 38 serves to optimize signals transmitted therefrom or received thereto. The wire interface unit 44 also includes a ring detection/hook control unit 39 connected to the line transformer 38 via transmitting and receiving signal lines and adapted to detect a ring signal and control a hook signal.

The radio interface unit 45 includes a first amplifying stage 49 and a second amplifying stage 52. The first amplifying stage includes a first operational amplifier 48 connected at a minus (−) terminal thereof to the transmitting signal line of the interface circuit unit 36 via a first resistor R1. The first operational amplifier 48 is also connected at a plus (+) terminal thereof to the reference voltage terminal Vref of the first switching unit 41 via a second resistor R2. The plus terminal of the first operational amplifier 49 and the reference voltage terminal Vref of the first switching unit 41 are connected in common to the ground via a fourth resistor R4. An output signal from the first operational amplifier 48 is fed back to the minus terminal of the first operational amplifier 48 via a third resistor R3. On the other hand, the second amplifying stage 52 includes a second operational amplifier 50 connected at a minus terminal thereof to the receiving signal line of the cellular phone modulator 40. The second operational amplifier 50 receives at a plus (+) terminal thereof a reference voltage Vref. An output signal from the second operational amplifier 50 is fed back to the minus terminal of the second operational amplifier 50 via a fifth resistor R5. The second amplifying stage 52 further includes a third operational amplifier 51 having a plus terminal to which the reference voltage Vref is applied. The third operational amplifier 51 also has a minus terminal to which an output signal from the third operational amplifier 51 is fed back.

The audio signal processing control unit 47 includes a parallel A/D and D/A converter 42 connected to the soft modem 35 via a data bus line, and a fourth operational amplifier 53 having a minus terminal connected to a signal line extending from a microphone 34 and a plus terminal connected to the ground. An output signal from the fourth operational amplifier 53 is fed back to the minus terminal of the fourth operational amplifier 53 via a potentiometer 46. The output terminal of the fourth operational amplifier 53 is also connected to the parallel A/D and D/A converter 42. The fourth operational amplifier 53 also includes a fifth operational amplifier 54 having a minus terminal connected to a transmitting signal line of the parallel A/D and D/A converter 42 and a plus terminal connected to the ground. An output signal from the fifth operational amplifier 54 is fed back to the minus terminal of the fifth operational amplifier 54 via another potentiometer 46. The output terminal of the fifth operational amplifier 54 is also connected to the speaker 33.

The first switching unit 41 includes four analog switches to send a transmitting signal from the analog interface unit 36 to the wire interface unit 44 or the radio interface unit 45. That is, the first switching unit 41 includes a first switch a adapted to connect the plus output terminal of the analog interface unit 36 to the transmitting terminal Tx+ of the hybrid circuit 37 by its switching operation, a second switch b adapted to connect the minus output terminal of the analog interface unit 36 to the transmitting terminal Tx− of the hybrid circuit 37 by its switching operation, a third switch c adapted to connect the plus output terminal of the analog interface unit 36 to the minus terminal of the first operational amplifier 48 of the wire interface unit 45 by its switching operation, and a fourth switch d adapted to connect the plus terminal of the first operational amplifier 48 of the radio interface unit 45 to the reference voltage terminal Vref by its switching operation.

The second switching unit 43 includes a fifth switch e adapted to connect the transmitting signal line of the radio interface unit 45 to the receiving signal line of the parallel A/D and D/A converter 42 by its switching operation, a sixth switch f adapted to connect the receiving signal line of the radio interface unit 45 to the transmitting signal line of the parallel A/D and D/A converter 42 by its switching operation, a seventh switch g adapted to connect the transmitting, signal line of the radio interface unit 45 to the transmitting signal line of the parallel A/D and D/A converter 42 by its switching operation, and an eighth switch h adapted to connect the receiving signal line of the radio interface unit 45 to the receiving signal line of the parallel A/D and D/A converter 42 by its switching operation.

Operation of the data interface circuit according to the present invention will now be described.

The first and second switching units 41 and 43 use analog switches. Under control of the analog switches, the data interface circuit operates in various modes. Where the cellular phone modulator 40 is to be used for an audio telephone, the fifth and sixth switches e and f of the second switching unit 43 are switched on so that an audio signal output from the microphone 34 can be sent to the transmitting terminal Tx of the cellular phone modulator 40 via the fourth operational amplifier 53 and the fifth switch e. The audio signal is then transmitted to the base station. After the audio signal is received by the cellular phone modulator 40 via the base station, it is applied to the speaker 33 via the fifth operational amplifier 54 by a switch-on operation of the sixth switch f. If it is desired to compress and store the content of communication, the eighth switch h of the second switching unit 43 is switched on. Under this condition, the content of communication input at the microphone 34 or the receiving terminal Rx of the cellular phone modulator 40 can be compressed in the parallel A/D and D/A converter 42 and then stored in the DSP of the soft modem 35.

For a data communication through a radio network, the third and fourth switches c and d are switched on so that an output signal from the analog interface unit 36 can be sent to the first amplifying stage 49 of the radio interface 45. The first amplifying stage 49 changes the signal from a differential-ended-signal (DES) type highly influenced by noise to a single-ended-signal (SES) type hardly influenced by noise. An output signal from the first amplifying stage 49 is sent to the transmitting terminal of the cellular phone modulator 40. On the other hand, a signal received by the receiving terminal Rx of the cellular phone modulator 40 is sent to the second amplifying stage 52 of the radio interface unit 45 which, in turn, changes the received signal from the SES signal type to the DES signal type. The changed signal is applied to a terminal AUX of the analog interface unit 36.

For a data transmission through a wire network, the first and second switches a and b of the first switching unit 41 are switched on so that an output signal from the analog interface unit 36 can be received to the hybrid circuit 37 of the wire interface unit 44. The receiving signal is separated by the hybrid circuit 37 and then optimized by the line transformer 38. Thereafter, the resulting signal is transmitted to the PSTN under a control of the ring detection/hook control unit 39. Upon a data reception, a signal is received by the analog interface unit 36 through a path reverse to that of the above-mentioned case. In this case, compression and storage of external audio signals received through the microphone 34 are carried out by the parallel A/D and D/A converter 42 under a condition that all switches e to h of the second switching unit 43 are switched off.

Compression and storage of other audio services, data or audio signals are carried out in the audio signal processing control unit 47 under a control of the second switching unit 43. Where the content of communication is to be checked during an execution of the modem function, the first switching unit 41 and the seventh switch g of the second switching unit 43 are controlled. For an automatic answering machine function of the radio network, the sixth to eighth switches f to h of the second switching unit 43 are switched on.

As apparent from the above description, the present invention provides a data interface circuit for portable radio terminal equipment having wire and radio data communication functions, thereby capable of being applied to a variety of communication systems. For a communication using a radio network, the signal type is changed from DES to SES by an operation of the radio interface unit 45, thereby enabling the redundancy to noise to be increased. Furthermore, it is possible to provide various audio services by the audio signal processing control unit 47.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A data interface circuit for connecting data terminal equipment to a public switched telephone network and a cellular network, comprising:

a soft modem adapted to control the overall system;

an D/A/A/D interface unit connected to the soft modem and adapted to convert data from analog to digital and digital to analog, respectively;

a wire interface unit for connecting the D/A/A/D interface unit to the public switched telephone network;

a radio interface unit for connecting the D/A/A/D interface unit to the cellular network via a cellular phone modulator;

an audio signal processing control unit connected to the soft modem and adapted to perform acoustic transducing of audio signals and at least one of compression and expansion of said audio signals;

a first switching unit adapted to switch a transmitting signal from the D/A/A/D interface unit to one of the wire interface unit and the radio interface unit; and a second switching unit adapted to selectively connect the audio signal processing control unit to the cellular phone modulator so as to bypass said soft modem and yet provide said acoustic transducing in support of said cellular phone modulator, said second switching unit including a first switch adapted to selectively connect a transmitting signal line of said radio interface unit to a receiving signal line of said audio signal processing control unit;

a second switch adapted to selectively connect a receiving signal line of said radio interface unit to a transmitting signal line of said audio signal processing control unit; and a third switch adapted to selectively connect said receiving signal line of said radio interface unit to said receiving signal line of said audio signal processing control unit to provide a data component of said compression.

2. The data interface circuit in accordance with claim 1, wherein the wire interface unit comprises:

a hybrid circuit provided with a receiving signal line directly connected to the D/A/A/D interface unit and a transmitting signal line indirectly connected to the D/A/A/D interface unit via the first switching unit, the hybrid circuit being adapted to separate a transmitting signal and a receiving signal from each other;

a line transformer connected to the hybrid circuit and adapted to optimize the transmitting signal and the receiving signal; and a ring detection/hook control unit connected to the line transformer and adapted to detect a ring signal and control a hook signal so that data can be transmitted from and received to the public switched telephone network.

3. The data interface circuit in accordance with claim 1, wherein the radio interface unit comprises:

a first amplifying stage including a first operational amplifier having a minus input terminal connected by the first switching unit to a transmitting signal line of the D/A/A/D interface unit via a first resistor, a plus input terminal connected to a reference voltage terminal by the first switching unit via a second resistor and an output terminal fed back to the minus input terminal via a third resistor, the plus terminal and the reference voltage terminal of the first switching unit being connected in common to the ground via a fourth resistor; and a second amplifying stage including a second operational amplifier and a third operational amplifier, the second operational amplifier having a minus input terminal connected to a receiving signal line of the cellular phone modulator, a plus input terminal receiving a reference voltage and an output terminal fed back to the minus input terminal of the second operational amplifier via a fifth resistor, the third operational amplifier having a plus input terminal receiving the reference voltage and a minus input terminal to which an output signal from the third operational amplifier is fed back.

4. The data interface circuit in accordance with claim 1, wherein the audio signal processing control unit comprises:
- a parallel A/D and D/A converter connected to the soft modem via a data bus line;
- a first operational amplifier having a minus input terminal connected to a signal line extending from a microphone, a plus input terminal connected to the ground and an output terminal fed back to the minus input terminal via a potentiometer and connected to the parallel A/D and D/A converter; and
- a second operational amplifier having a minus input terminal connected to a transmitting signal line of the parallel A/D and D/A converter, a plus input terminal connected to the ground and an output terminal fed back to the minus input terminal of the said operational amplifier via another potentiometer and an output of which is connected to a speaker.

5. The data interface circuit in accordance with claim 1, wherein the first switching unit comprises a plurality of analog switches for sending the transmitting signal from the D/A/A/D interface unit to the wire interface unit or the radio interface unit in a controlled manner.

6. The data interface circuit in accordance with claim 1, wherein the second switching unit comprises:
- a fourth switch adapted to selectively connect the transmitting signal line of the radio interface unit to the transmitting signal line of the audio signal processing control unit.

7. The data interface circuit in accordance with claim 1, wherein said second switching unit is also adapted to selectively connect said soft modem to said radio interface unit by way of said audio signal processing control unit, said audio signal processing control unit being operable to compress said audio signals exchanged with said radio interface and being operable to provide such compressed audio signals to said soft modem.

8. The data interface circuit in accordance with claim 1, wherein said cellular network is an analog cellular network.

9. The data interface circuit in accordance with claim 1, wherein said radio interface unit is operable to exchange differential-ended (DE) signals with said D/A/A/D interface and is also operable to convert said DE signals to single-ended (SE) signals and to exchange said SE signals with said cellular phone modulator.

* * * * *